United States Patent [19]

Sakamoto

[11] Patent Number: 4,611,783
[45] Date of Patent: Sep. 16, 1986

[54] BODY-WEIGHT ADJUSTING DEVICE OF A SEAT SUSPENSION

[75] Inventor: Takao Sakamoto, Akishimashi, Japan

[73] Assignee: Tachikawa Spring Co., Ltd., Tokyo, Japan

[21] Appl. No.: 688,917

[22] Filed: Jan. 4, 1985

[51] Int. Cl.[4] .................................... F16M 13/00
[52] U.S. Cl. ............................ 248/588; 108/145; 248/564; 248/594
[58] Field of Search ............ 248/588, 584, 592, 594, 248/595, 564, 574, 421, 422; 297/338, 345; 108/145; 296/65 R

[56] References Cited

U.S. PATENT DOCUMENTS

| 3,390,857 | 7/1968 | Nyström ........................ 248/564 |
| 3,473,844 | 10/1969 | Zinnkann ...................... 297/345 |
| 3,826,457 | 7/1974 | de Longchamp ............... 248/564 |
| 4,072,287 | 2/1978 | Swenson et al. ............ 248/588 X |
| 4,128,225 | 12/1978 | Klüting et al. ................ 248/421 |
| 4,151,973 | 5/1979 | Sedlock ........................ 248/588 X |
| 4,382,573 | 5/1983 | Aondetto ..................... 248/588 X |
| 4,448,386 | 5/1984 | Moorhouse et al. ............ 248/564 |

Primary Examiner—Ramon O. Ramirez
Attorney, Agent, or Firm—Hoffmann, Dilworth, Barrese & Baron

[57] ABSTRACT

A body-weight adjusting device for a seat suspension is provided including a combination of bell cranks, tension springs and a connecting rod. Vertical movement of an operation lever results in an increase or decrease in the tension of the springs (depending upon the starting position of the lever) in response to which the seat suspension mechanism is raised or lowered correspondingly so as to permit a selective adjustment of the seat suspension in accordance with the weight of a seated occupant.

3 Claims, 4 Drawing Figures

BODY-WEIGHT ADJUSTING DEVICE OF A SEAT SUSPENSION

BACKGROUND OF THE INVENTION

1. Field Of The Invention

The present invention relates to a body-weight adjusting device for use with a vehicle seat suspension.

2. Description Of The Prior Art

It is known to be desirable to provide a vehicle seat, especially for a driver, with a seat suspension capable of a height adjustment in accordance with the weight of the occupant.

Hitherto, it has been proposed to provide a device capable of such an adjustment, a typical one of which will be described with reference to FIG. 1 and 2 of the accompanying drawings. In FIG. 1, (1) and (2) refer to an upper frame and a lower frame, respectively, of a seat. Lower frame (2) is formed substantially in a rectangular shape and made of a metallic frame substantially ]-shaped in section with the opening defined in the thus ]-shaped frame being faced to each other inwardly of the frame. Upper frame (1) is basically formed in a flat, plate-like shape with both the laterial portions thereon, or the optionally required portions thereof, being bent downwards. The frame is made of a metallic material of a configuration substantially conforming to that of lower frame (2). To this upper frame (1), a cushion member is mounted, using what may be termed a "cushion pan" (now shown).

Between upper frame (1) and lower frame (2), there is interposed a pair of X-shaped links (3) which constitute a seat suspension. This seat suspension is of a well-known type and comprises two links (4) and (5) rotatably, pivotally supported at pivot means (6) substantially centrally of each link. Upper end portion (5a) of link (5) is rotatably fixed by pivot means (7) to upper frame (1) rearwardly of the links, whereas lower end portion (4b) is rotatably fixed by pivot means (8) to lower frame (2) with the other lower end portion (5b) being slidably secured to lower frame (2) by means of a roller (9), or the like, so as to be movable forwardly and rearwardly relative to lower frame (2). The forwardly-located upper end portions (4a) of X-shaped links (3) are coupled by means of a rod (10) extended therebetween, thereby supporting the forward portion of upper frame (1) in a direction from the bottom of the seat. The rearwardly-located upper end portions (51) are coupled by means of a frame member (11) to which a pair of tension springs (12) are secured one at each end thereof.

With reference to both FIGS. 1 and 2, a bell crank (14) is rotatably fixed by pivot means (13) to the inner surface of upper frame (1) in such an arrangement that one end portion thereof is engaged with a nut (21) of an adjusting spindle (15) while the other end portion thereof is rotatably connected to one end of a tension frame (16) by means of pivot means (17). Tension frame (16) is connected at the other end thereof to the center portion of an equalizer frame (18) by pivot means (19) so as to be rotatable about said pivot means. Equalizer frame (18) is secured at both ends thereof to the other ends of the foregoing pair of tension springs (12), respectively. Adjusting spindle (15) consists of a rotary shaft with a thread (20) partially formed thereon, nut (21) being engaged with said thread.

Substantially at the center of the thus-constructed seat, a shock absorber (22) is arranged such that the one end thereof is rotatably affixed to the rear frame section of lower frame (2) and the other end is rotatably fixed to rod (10).

Several drawbacks or disadvantages are associated with the above-described conventional device. Springs (12) cannot be spaced apart from each other to any large extent. Consequently the relatively closed spaced springs (12) do not provide a stable adjustment of a seat suspension when a heavy weight load is applied to the seat. In addition, for adjustment of the seat suspension to accommodate a heavy occupant, adjusting spindle (15) must be rotated manually quite a number of times. For example, when it is desired to adjust the seat suspension for a variation in an occupant's weight from 50 kg up to 100 kg, adjusting spindle (15) must be rotated approximately 16 times. Moreover, rotation of the spindle become more difficult as the required adjustment approaches 100 kg. Consequently, operation of the foregoing seat adjusting means is extremely poor. Furthermore, it is be noted that adjusting spindle (15) is inaccessible when the door of the vehicle is closed.

SUMMARY OF THE INVENTION

With a view to obviating the above-mentioned drawbacks of the aforedescribed body-weight adjusting device, it is a primary object of the present invention to provide an improved body-weight adjusting device of a seat suspension which facilitates height adjustment of the seat suspension in accordance with the weight of an occupant sitting on the seat.

To achieve the above object, the present invention comprises a connecting rod extending transversely relative to the seat suspension body and mounted for rotation about its own axis, a pair of bell cranks whose end portions are each rotatably fixed to the respective ends of the connecting rod, a pair of springs extended between one upper end of a link mechanism which constitutes the seat suspension body and the other end portions of the bell cranks, a cam in a sliding engagement with one of the pair of bell cranks, a rotary shaft fixed to the cam, and a control lever fixed to one end of the rotary shaft such that it extends in a direction vertically crossing the axis of the rotary shaft, whereby operation of the control lever caused the springs to be stretched or loosened, to thereby increase or decrease in the tension of the springs. Accordingly, the vertical operation of the lever causes an increase or decrease in the tension of the pair of springs extended between the upper ends of the seat suspension and the bell cranks so as to permit a selective height adjustment of the seat suspension in accordance with the weight of an occupant sitting on the seat.

In this context, the seat suspension may be constructed in the form of a pair of X-shaped links, or a pair of two-parallel links.

It is another object of the present invention to provide a thin structure of the seating portion of the seat.

To this end, in accordance with the present invention, the aforementioned pair of springs are arranged such as to be spaced apart from each other at a great distance, so that the upholstery of the seat is so formed as to be lowered or recessed in the area between such pair of springs, thereby providing a relatively lower seating level; in other words, a thin structure of the seat can be obtained. For that purpose, in one aspect of the present invention, a long connecting rod is provided, which extends fully transversely between a pair of X-shaped links, or a pair of two-parallel links, which constitute the seat suspension, and a pair of springs are each connected at one end thereof to the respective upper ends of the X-shaped or two-parallel links and further connected at the other end thereof to the respective ends of the long connecting rod, whereby a relatively wide space is defined between such pair of springs, allowing a substantive seating portion of the seat to be formed in a lower level, thus resulting in a thin structure of the seat.

DESCRIPTION OF THE PREFERRED EMBODIMENTS

Figure 1:
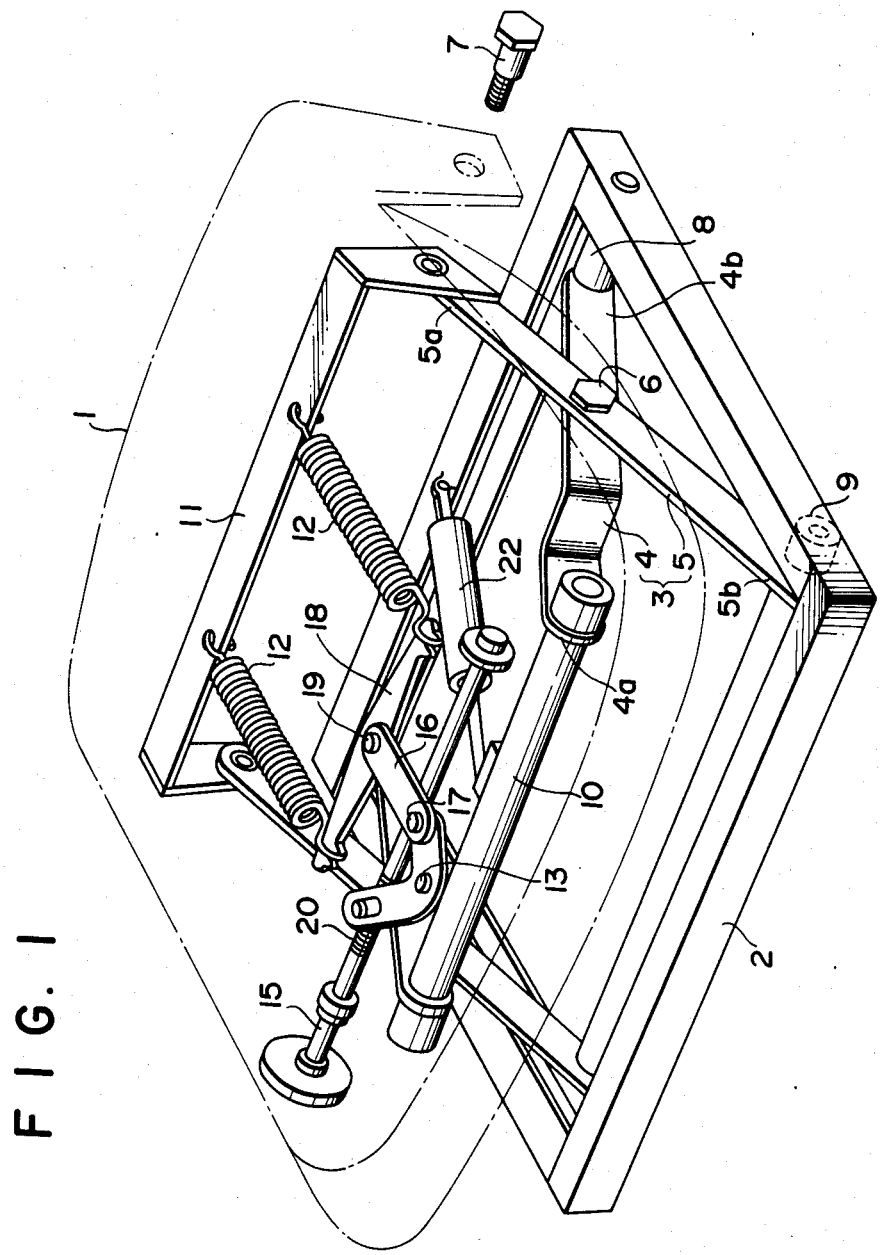
FIG. 1 is a perspective view of a conventional seat suspension.
Figure 2:
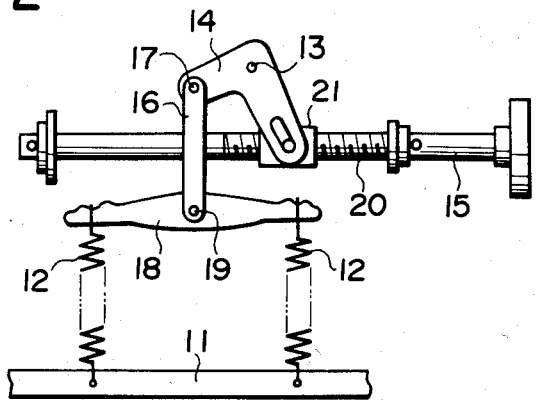
FIG. 2 is a plane view of one part thereof.

With main reference to FIGS. 3 and 4, one embodiment of the present invention will be described. However, reference is also made to FIG. 1 and FIG. 2 for better understanding of the present invention since like designations will appear, referring to like parts of components.

Figure 3:
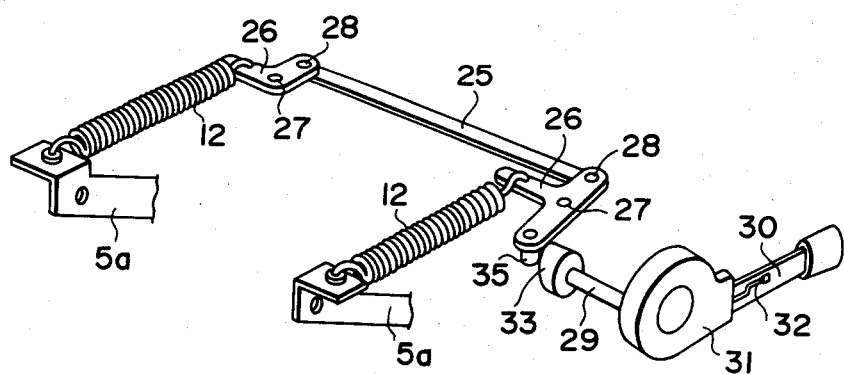
FIG. 3 is a perspective view of principal part of the device according to the present invention; and, FIG. 4 is a partially enlarged side view thereof.
Figure 4:
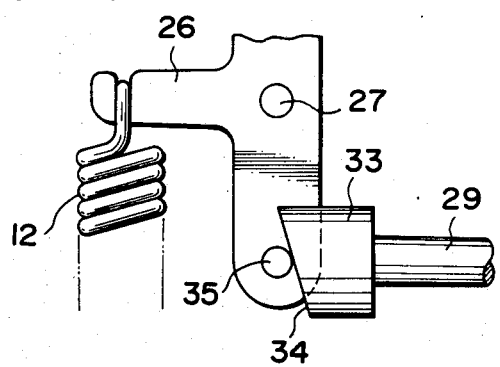

In FIG. 3 there is illustrated a connecting rod (25) extending transversely with respect to the seat suspension body and movable substantially in the same transverse direction.

A pair of bell cranks (26) are each rotatably connected by means of pivot means (27) secured to the frame at an appropriate location, e.g., to the inner wall of upper frame (1). Further, bell cranks (26) are spaced apart from each other at a predetermined distance and are each at one end thereof rotatably connected by means of pivot (28) to the respective end of connecting rod (25) with each being connected at its other end to tension springs (12). In this structure, it is seen that the transverse movement of connecting rod (25) causes the pair of bell cranks to rotate in a synchronized manner and in an identical direction.

A rotary shaft (29) is provided substantially in parallel with connection rod (25). A control lever (30) is connected to rotary shaft (29) such that it is disposed in a direction substantially vertically crossing the axis of said rotary shaft. A locking means (31) is provided at the junction of control lever (30) and rotary shaft (29).

A cam (33) is integrally connected to the forward end of rotary shaft (29) with the forward surface of the cam configured so a to have an obliquely cut engaging surface (34).

One of the pairs of bell cranks (26) has an extended portion in which a pin (35) (or roller) projects therefrom.

Surface (34) of cam (33) is in slidable engagement with pin (35) of the above-mentioned extended portion.

Regarding locking means (31), it is provided with a small lever (32) which extends along control lever (30) so that operation of said small lever is effected simultaneously with the operation of control lever (30). When small lever (32) is pressed toward the wall of control lever (30), locking means (31) is thereby actuated so as to release control lever (30) from the locked state allowing lever (30) to move freely. However, when the operator's hand holding control lever (30) releases small lever (31), locking means (31) is placed in the locked condition to thereby prevent rotary shaft (29) from rotational movement. This locking mechanism is a well-known, conventional one and therefore requires no separate detailed description. When locking means (31) is released from the locked state by pressing small lever (32), control lever (30) is then allowed to move vertically. Vertical movement or operation of control lever (30) causes the simultaneous rotation of rotary shaft (29) as well as cam (33). Thus, bell crank (26) on the right side as shown in FIG. 3 is rotated about pivot (27) due to the travel of pin (35) of bell crank (26) resulting from engagement with the oblique surface of cam (33). In response to such rotation of bell crank (26), connecting rod (25) is moved transversely relative to the seat suspension thereby causing bell crank (26) on the left side to rotate in a direction identical to the bell crank on the right side, i.e., bell cranks (26) on the right and left sides are rotated in a synchronized manner with each other whereby the tension on the pair of tension springs (12) connected to the bell cranks is increased or decreased. This mechanism permits the height adjustment of the seat suspension in accordance with the weight of an occupant seated thereon.

As described hereinbefore, in accordance with the present invention, only a vertical rotational movement of control lever (30) is required to provide a height adjustment of the seat suspension even when the vehicle is being driven or the doors thereof are closed.

Furthermore, in accordance with the present invention, it will be appreciated that the distance between a pair of tension springs can be increased in comparison to that provided with the conventional device, thus defining a wide space centrally of the seat suspension and allowing the seat portion of the cushion pad to be formed in a lower level through such wide space. Thus, the substantial seat portion of the cushion pad can be lowered or recessed through the space between the tension springs as well as between the seat suspension. Therefore, it is possible to provide a thinner seat profile.

I claim:

1. A body-weight adjusting device of a seat suspension comprising:
    (a) a link means constituting said seat suspension;
    (b) a pair of tension springs each being connected at one end thereof to one of the upper ends of said link means;
    (c) a pair of rotatable bell cranks each being connected at one end thereof to the other end of each of said tension springs;
    (d) a connecting rod rotatably connected to each of the other ends of said bell cranks;
    (e) a pin means formed on one of said bell cranks such that it projects therefrom;
    (f) a rotary shaft arranged substantially in a direction substantially parallel with said connecting rod;
    (g) a control lever connected to said rotary shaft such that it is disposed in a direction substantially vertical to the axis of said rotary shaft; and
    (h) a cam provided on said rotary shaft, said cam having an engaging surface such that movement of said cam surface against the pint results in a rotational movement of the bell cranks.

2. The body-weight adjusting device of a seat suspension in accordance with claim 1, wherein said link means comprises a pair of X-shaped links or a pair of two-parallel links.

3. The body-weight adjusting device of a seat suspension in accordance with claim 1, wherein a locking means is provided between said control lever and said rotary shaft.

* * * * *